(12) United States Patent
Pencak

(10) Patent No.: US 11,358,520 B2
(45) Date of Patent: Jun. 14, 2022

(54) VEHICLE TAILLIGHT ASSEMBLY

(71) Applicant: NISSAN NORTH AMERICA, INC., Franklin, TN (US)

(72) Inventor: Jeffrey Pencak, Howell, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/067,535

(22) Filed: Oct. 9, 2020

(65) Prior Publication Data

US 2022/0111787 A1    Apr. 14, 2022

(51) Int. Cl.
 *B60Q 1/26*      (2006.01)
 *F21S 43/19*     (2018.01)
 *B60Q 1/30*      (2006.01)

(52) U.S. Cl.
 CPC ............. *B60Q 1/2623* (2013.01); *B60Q 1/30* (2013.01); *F21S 43/195* (2018.01)

(58) Field of Classification Search
 CPC .................................. B60Q 1/2623; B60Q 1/30
 See application file for complete search history.

(56) References Cited

U.S. PATENT DOCUMENTS

| | | | | |
|---|---|---|---|---|
| 4,532,578 A | * | 7/1985 | Gaden | B60Q 1/2607 362/365 |
| 4,742,435 A | * | 5/1988 | Van Duyn | B60Q 1/0683 362/289 |
| 4,899,262 A | * | 2/1990 | Hammond | B60Q 1/2607 362/249.01 |
| 4,994,942 A | * | 2/1991 | Georgeff | B60Q 1/2607 362/368 |
| 5,154,505 A | * | 10/1992 | Sasamoto | B60Q 1/0441 362/368 |
| 6,374,766 B1 | * | 4/2002 | Clark | B60Q 1/30 116/28 R |
| 10,752,294 B2 | * | 8/2020 | Marchlewski | B62D 25/08 |

OTHER PUBLICATIONS

Honda, Ridgeline, 2017 model year.
Ford, Ranger, 2017 model year.
Toyota, Tacoma, 2016 model year.
Chevy, Colorado, 2015 model year.

* cited by examiner

*Primary Examiner* — Julie A Bannan
(74) *Attorney, Agent, or Firm* — Global IP Counselors, LLP

(57) ABSTRACT

A vehicle taillight assembly includes a first bracket and a second bracket. The first bracket is configured to be supported to a vehicle strut structure. The second bracket is fixed to the first bracket at an inboard facing side of the first bracket. The second bracket protrudes in an inboard facing direction towards the vehicle strut structure.

15 Claims, 7 Drawing Sheets

VEHICLE TAILLIGHT ASSEMBLY

BACKGROUND

Field of the Invention

The present invention generally relates to a vehicle taillight assembly. More specifically, the present invention relates to vehicle taillight assembly having a bracket assembly.

Background Information

Vehicle are typically provided with taillamp structure that supports a lamp housing. The lamp housing can be considered part of an overall vehicle structure.

SUMMARY

In view of the state of the known technology, one aspect of the present disclosure is to provide a vehicle taillight assembly that comprises a first bracket and a second bracket. The first bracket is configured to be supported to a vehicle strut structure. The second bracket is fixed to the first bracket at an inboard facing side of the first bracket. The second bracket protrudes in an inboard facing direction towards the vehicle strut structure.

In view of the state of the known technology, another aspect of the present disclosure is to provide a vehicle taillight assembly that comprises a vehicle body structure, a first bracket, a lamp housing and a second bracket. The vehicle body structure has a cavity defined by a vehicle strut structure. The first bracket is supported to the vehicle strut structure. The lamp housing is supported to the first bracket so to be disposed in the cavity. The second bracket is positioned between the first bracket and the vehicle strut structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
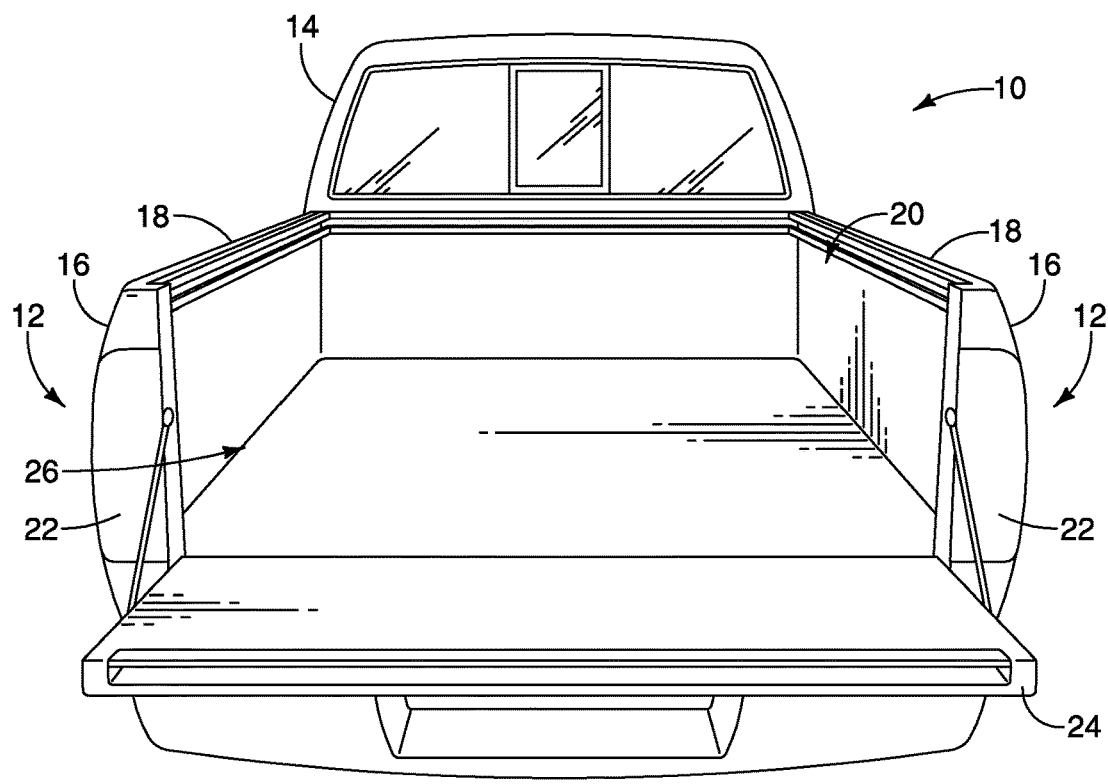
FIG. 1 is a rear plan view of a vehicle that is equipped with a pair of taillamp assemblies in accordance with an illustrated embodiment.

Referring to FIG. 1, a vehicle 10 is equipped with a vehicle taillight assembly 12 in accordance with an illustrated embodiment. In particular, the vehicle 10 is equipped with a pair of taillight assemblies 12 that are each installed to a lateral rear side of the vehicle 10. As seen in FIG. 1, the vehicle 10 is a pickup truck having a passenger cabin 14 and a cargo area 20 defined by a vehicle body structure 21. The vehicle body structure 21 includes an outer panel 16 of the vehicle 10 that forms substantially the outer contours and shape of the vehicle 10. The vehicle body structure 21 further includes a pair of sidewalls 18 and a pair of strut structures 22 that together define the cargo area 20 of the vehicle 10.

The vehicle 10 includes a tailgate 24 that is installed between the strut structures 22 and is movable between a closed orientation (an upright orientation) to close a tailgate opening 26 of the vehicle 10 and an open orientation (a lowered orientation) to access the cargo area 20 in a conventional manner. The tailgate opening 26 is defined as the area extending between the strut structures 22 at a rearward end of the sidewalls 18. The sidewalls 18 extend from the passenger cabin 14 rearwardly to the tailgate opening 26. The strut structures 22 define lateral sides of the tailgate opening 26 and define a rear end of the vehicle 10. The outer panel 16, the sidewalls 18 and the strut structures 22 are all considered vehicle body components of the vehicle 10 in the illustrated embodiment. That is, the outer panel 16, the sidewalls 18 and the strut structures 22 are together form part of the vehicle body structure 21 of the vehicle 10.

Figure 2:
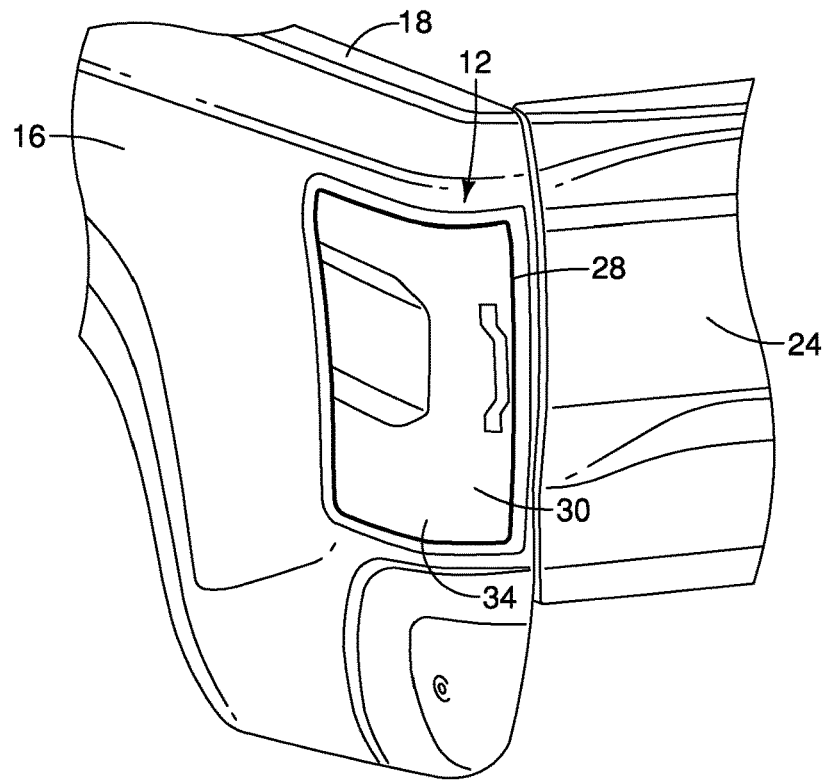
FIG. 2 is an enlarged perspective view of a rear corner the vehicle of FIG. 1 to show a taillight assembly that is installed to the vehicle.
Figure 5:
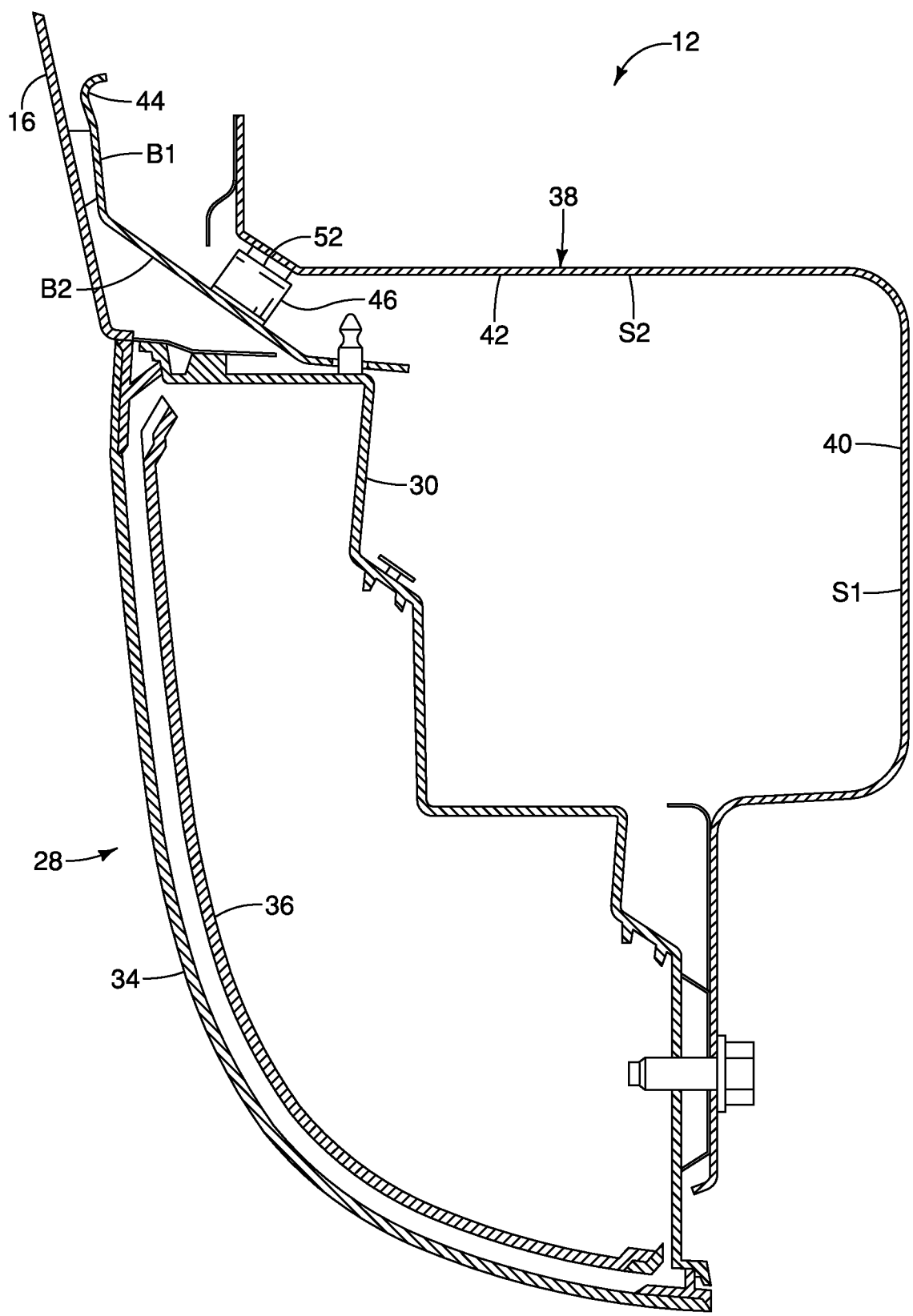
FIG. 5 is a cross-sectional view of the taillight assembly.

The vehicle taillight assemblies 12 are basically identical except for being mirror images of one another and are installed onto opposite lateral sides of the vehicle 10. Therefore, for brevity, only the vehicle taillight assembly 12 that is installed onto the driver's side sidewall 18 and the driver's side strut structure 22, as seen in FIG. 2, will be further discussed herein. As shown in FIGS. 2 and 5, the vehicle taillight assembly 12 further comprises a lamp assembly 28 having a lamp housing 30 that is supported to the vehicle strut structure 22.

In particular, the lamp housing 30 is fitted into a cavity 32 (shown in FIG. 3) of the vehicle body structure 21. In the illustrated embodiment, the cavity 32 is an opening formed by the outer panel 16 and the vehicle strut structure 22. Therefore, the outer panel 16 of the illustrated embodiment includes a rear fender lamp opening that is the cavity 32. The lamp assembly 28 is preferably a light-weight assembly that includes various components for illuminating an area external to the vehicle 10. For example, the lamp assembly 28 can include some or all of a backup lamp section, a turn-signal section, a braking lamp section and a running lamp section. The lamp assembly 28 further includes a lens 34 which encloses the lamp housing 30 and preferably a lamp reflector 36 as needed and/or necessary, as shown in FIG. 5. The components of the lamp assembly 28 are conventional vehicle features, further description is omitted for the sake of brevity.

Figure 3:
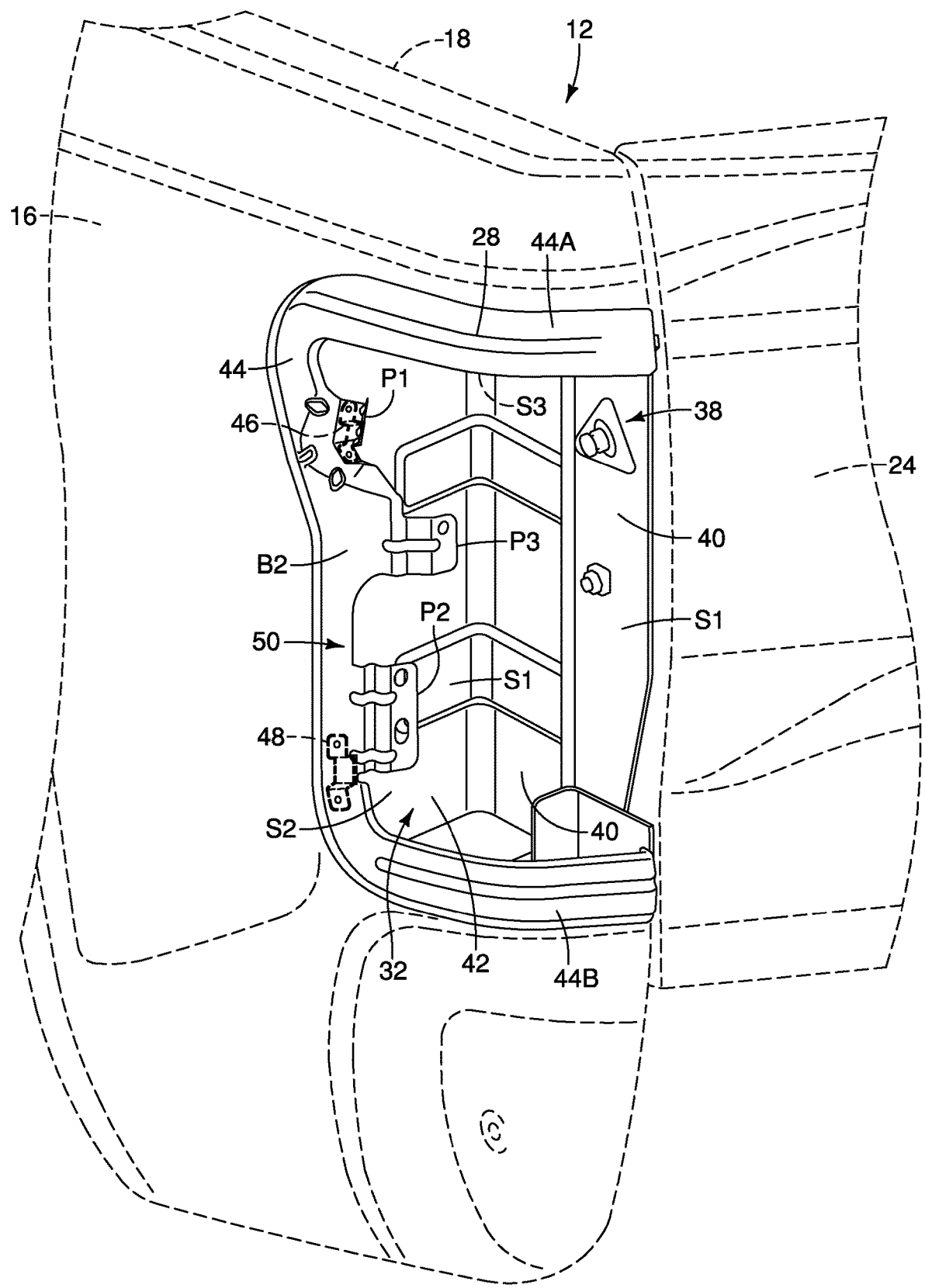
FIG. 3 is an enlarged view of the taillight assembly of FIG. 2 in which a lamp housing of the taillight assembly has been removed.
Figure 4:
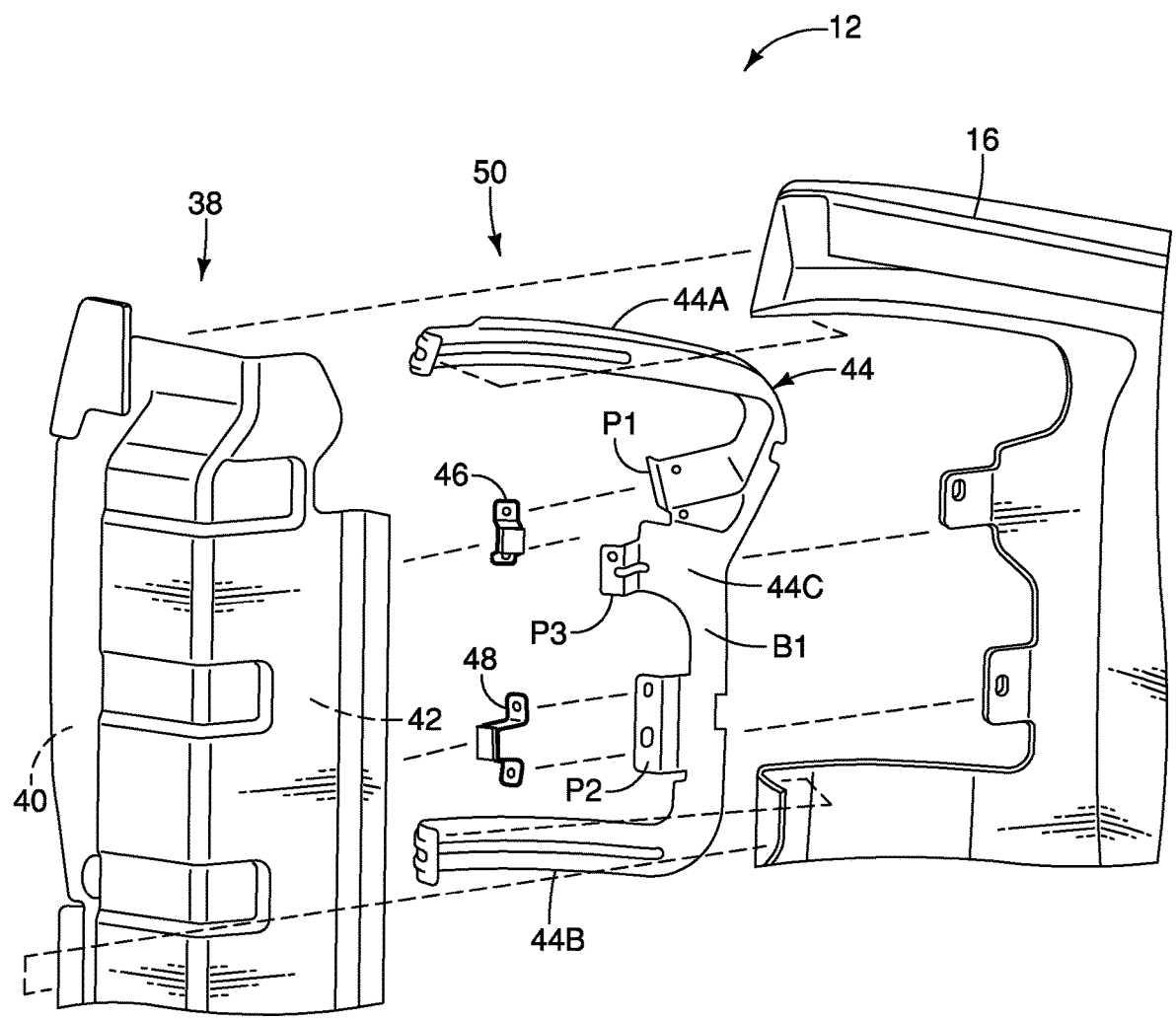
FIG. 4 is an exploded view of the taillight assembly.

Referring to FIGS. 3 to 5, the vehicle strut structure 22 includes an inner assembly 38 that is also considered a vehicle body component of the vehicle 10. The inner assembly 38 is a metal panel that is supported to the sidewall 18, the outer panel 16 and the vehicle strut structure 22. The inner assembly 38 also at least partially defines the cavity 32. As best seen in FIG. 3, the cavity 32 is defined by the inner assembly 38 and the sidewall 18. In particular, the cavity 32 includes a space that is formed between the inner assembly 38 and the sidewall 18 of the vehicle body structure 21.

As shown in FIG. 3, the cavity 32 is therefore at least partially defined by the inner assembly 38 of the strut structure 22. Specifically, the inner assembly 38 of the strut structure 22 includes an outboard panel 40 that has an outboard facing surface 51 that faces in a direction away from the tailgate opening 26. The cavity 32 is partially defined by the outboard panel 40. The inner assembly 38 further includes a rearward panel 42 having a rearward facing surface S2 that faces away in a vehicle rearward direction away from the passenger's cabin 14. The rearward facing surface S2 also partially defines the cavity 32. The cavity 32 is also at least partially defined by an inside wall section S3 of the sidewall 18. In the illustrated embodiment, the vehicle taillight assembly 12 comprises at least a portion of the vehicle strut structure 22 including the vehicle body components that form the cavity 32.

Referring to FIGS. 3 to 6, the vehicle taillight assembly 12 comprises a first bracket that is an attachment bracket 44. The attachment bracket 44 is configured to be attached to the vehicle strut structure 22, as shown in FIG. 3. In particular, the attachment bracket 44 is configured to be supported to the inner assembly 38 and to the outer panel 16 of the vehicle 10. Preferably, the attachment bracket 44 has an overall shape that substantially corresponds to the cavity 32 and to the lamp housing 30. The lamp housing 30 is attached to the attachment bracket 44. The lamp housing 30 is supported to the cavity 32 by the attachment bracket 44, as will be further described below. As shown, the vehicle taillight assembly 12 further comprises a second bracket 46 and a third bracket 48 that are supported to the attachment bracket 44, as will be further discussed below.

Figure 9:
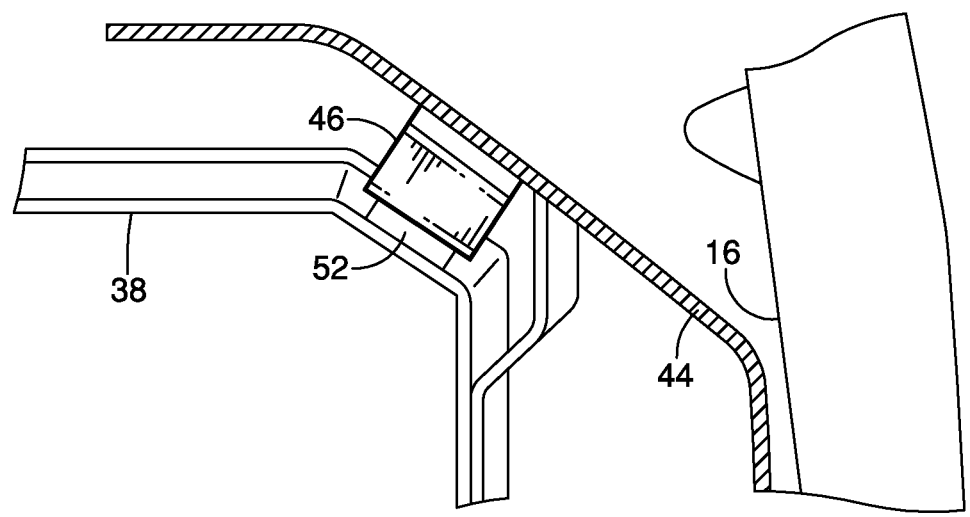
FIG. 9 is an enlarged cross-sectional view of the bracket of FIG. 7 as assembled within the taillight assembly.
Figure 10:
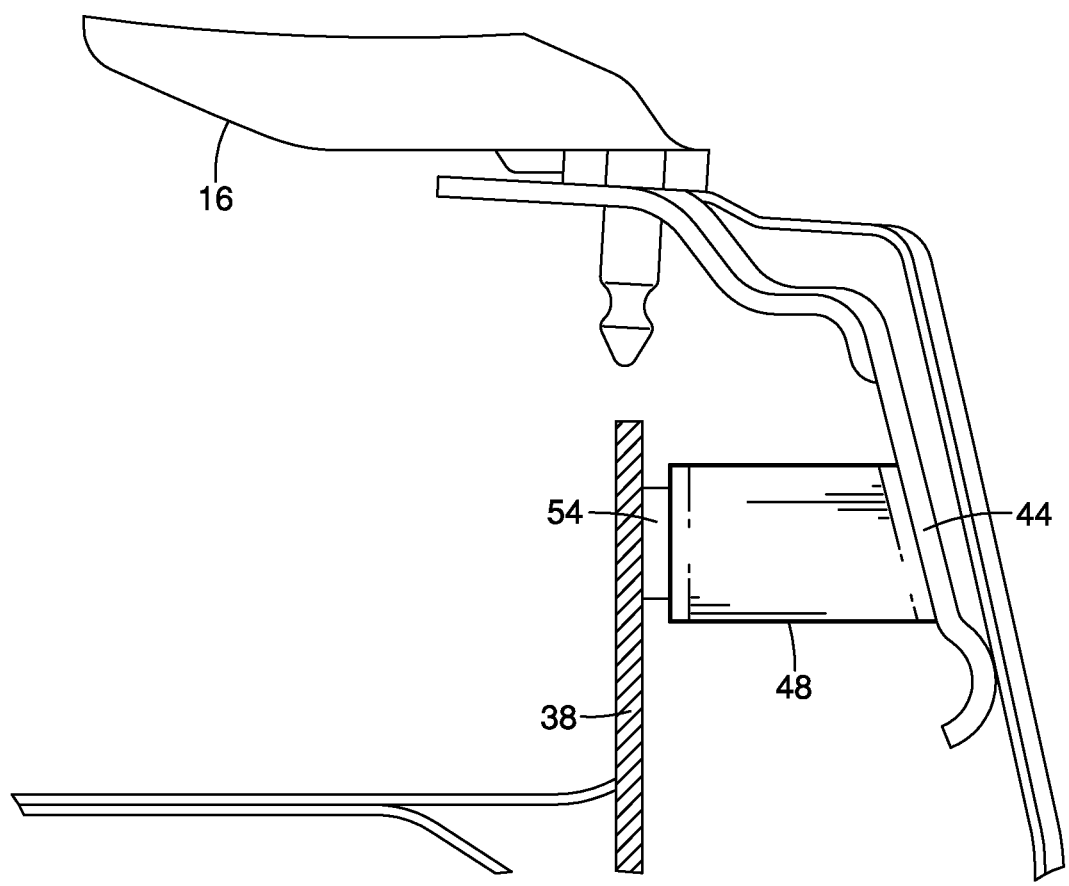
FIG. 10 is an enlarged cross-sectional view of the bracket of FIG. 8 as assembled within the taillight assembly.

As best seen in FIG. 4, during assembly of the vehicle body components, the outer panel 16 is fitted to the inner assembly 38 of the vehicle strut structure 22. Due to variations in manufacturing and/or assembly conditions, the size and configuration of the cavity 32 that receives the lamp housing 30 will vary. As a result, the lamp housing 30 may be ill-fitted with respect to the outer panel 16, the inner assembly 38 and the other outer structures of the vehicle 10. Therefore, the vehicle taillight assembly 12 is provided as having a bracket assembly 50 in accordance with the illustrated embodiment. In the illustrated embodiment, the bracket assembly 50 includes the attachment bracket 44 and at least the second bracket 46. In the illustrated embodiment, the bracket assembly 50 further includes the third bracket 48. As best seen in FIGS. 5, 9 and 10, the second and third brackets 46 and 48 are supported on an inboard facing side B1 of the attachment bracket 44 that faces towards the inner assembly 38. The lamp assembly 28 is supported to an outboard facing side B2 of the attachment bracket 44 that faces away from the inner assembly 38.

The bracket assembly 50 is positioned between the inner assembly 38 and the outer panel 16 to maintain a desired distance between the inner assembly 38 and the outer panel 16. In this way, the bracket assembly 50 is provided to form a desired size and shape of the cavity 32 that receives the lamp housing 30. In particular, the arrangement of the bracket assembly 50 with respect to the inner assembly 38 and the outer panel 16 is designed to help maintain a secure or snug fit of the lamp housing 30 within the cavity 32. In other words, the lamp housing 30 is configured to abut or contact the bracket assembly 50 so that the lamp housing 30 is not "floating" or loose within the cavity 32. The arrangement of the bracket assembly 50 with respect to the inner assembly 38 and the outer panel 16 helps maintain a consistent size and shape of the cavity 32 so that the lamp housing 30 has a finished styling with respect to the outer panel 16.

As best seen in FIG. 4, the attachment bracket 44 is configured to be fixedly attached to the vehicle outer panel 16 and to be supported the strut structure 22. In particular, the attachment bracket 44 is snapped or fitted to the outer panel 16 by conventional means. As best seen in FIG. 4, the outer panel 16 is clipped to or snapped to the inner assembly 38 by conventional means. In this way, the attachment bracket 44 is supported to the inner assembly 38 or the vehicle strut structure 22. It will be apparent to those skilled in the vehicle field from this disclosure that the attachment bracket 44 can alternatively be directly supported to the vehicle strut structure 22, such as being attached to the inner assembly 38 by snaps or fasteners.

Figure 6:
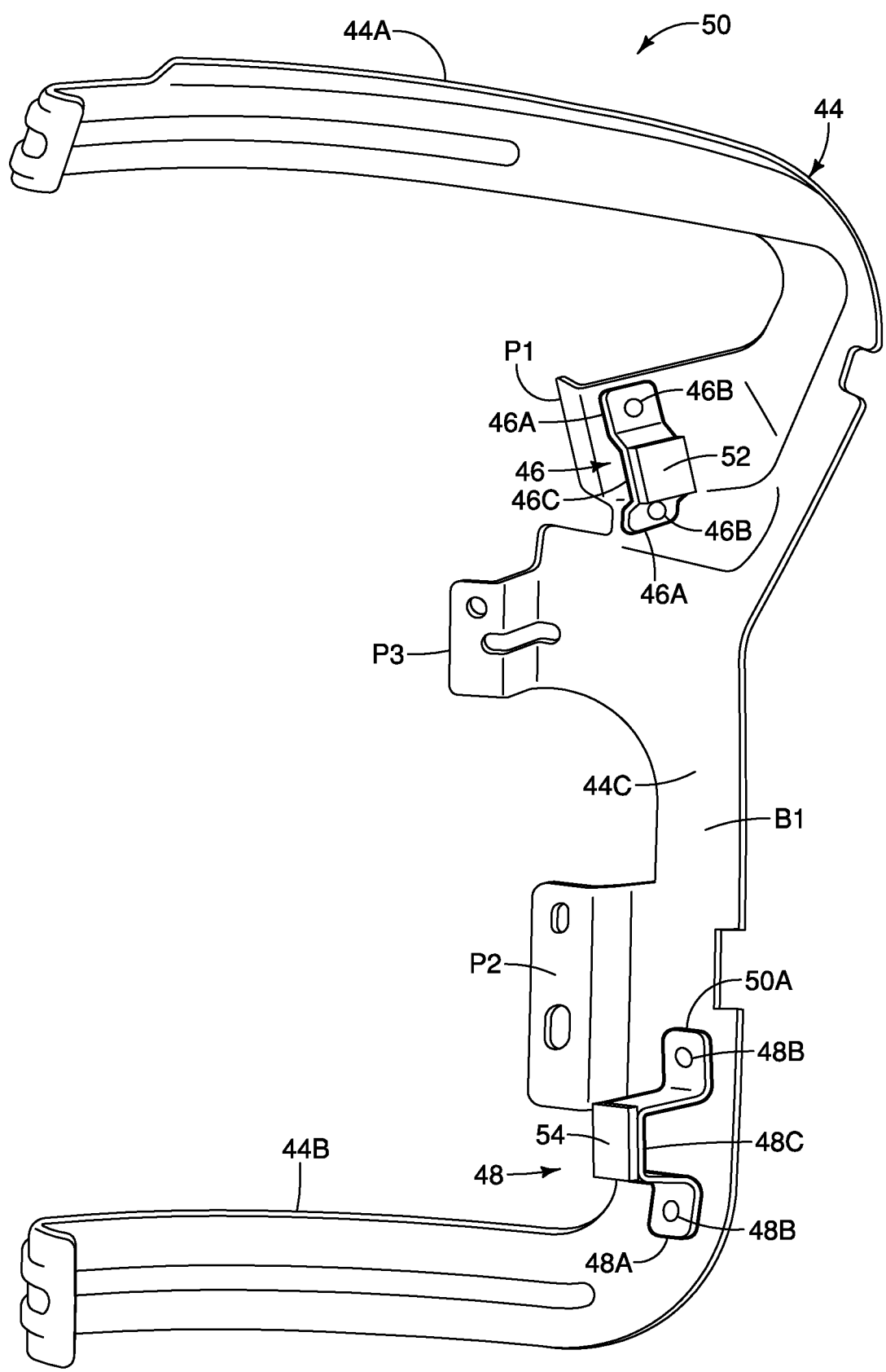
FIG. 6 is a plan view of a bracket assembly of the taillight assembly.

The lamp housing 30 is supported to the attachment bracket 44 so to be disposed in the cavity 32. Referring to FIGS. 4 and 6, the attachment bracket 44 includes a pair of attachment arms 44A and 44B that are illustrated as being configured to be attached to the outer panel 16. The attachment arms 44A and 44B can be clipped or snapped to the outer panel 16 in a conventional manner. Alternatively, it will be apparent to those skilled in the vehicle field from this disclosure that the attachment arms 44A and 44B can be attached to the inner assembly 38 by fasteners if desired. As best seen in FIGS. 3, 4 and 6, the attachment arms 44A and 44B include an upper extending arm 44A and a lower extending arm 44B that extend horizontally with respect to the vehicle 10 when the attachment bracket 44 is attached to the vehicle strut structure 22.

The attachment bracket 44 further includes a main body 44C that is cantilevered with respect to the pair of attachment arms 44A and 44B. In particular, the main body 44C extends between the pair of attachment arms 44A and 44B in a vertical direction along the vehicle body structure 21 when the attachment bracket 44 is attached to the vehicle strut structure 22. The attachment bracket 44 has a substantially C-shape as defined by the attachment arms 44A and 44B and the main body 44C. The attachment arms 44A and 44B protrude rearwardly with respect to the main body 44C away from the outer panel 16 when the attachment bracket 44 is installed to the vehicle 10. More specifically, the attachment arms 44A and 44B curve rearwardly so that the attachment arms 44A and 44B substantially correspond to the outer contours of the outer panel 16 to help provide a finished look once the attachment bracket 44 and the lamp housing 30 are installed to the cavity 32.

As best seen in FIGS. 3, 4 and 6, the main body 44C includes a first projection P1, a second projection P2 and a third projection P3. The first projection P1, the second projection P2 and the third projection P3 all extend from the main body 44C in a direction towards the inner assembly 38 when the attachment bracket 44 is attached to the inner assembly 38. The first, second and third projections P1, P2 and P3 each have attachment flanges for attaching the attachment bracket 44 to the lamp housing 30. In particular, the first and second projection P1 and P2 (e.g., the top and lower projections) each receive one or more fasteners for fastening the lamp housing 30 to the first and second projection P1 and P2 in a conventional manner. The third projection P3 is located below the first projection P1 and above the second projection P2. Although not shown, the third projection P3 has an inboard extending flange that is welded to the inner assembly 38. The attachment of the attachment bracket 44 to the vehicle body components and to the lamp housing 30 can be similar to that as described in U.S. patent application Ser. No. 16/804,963.

Figure 8:
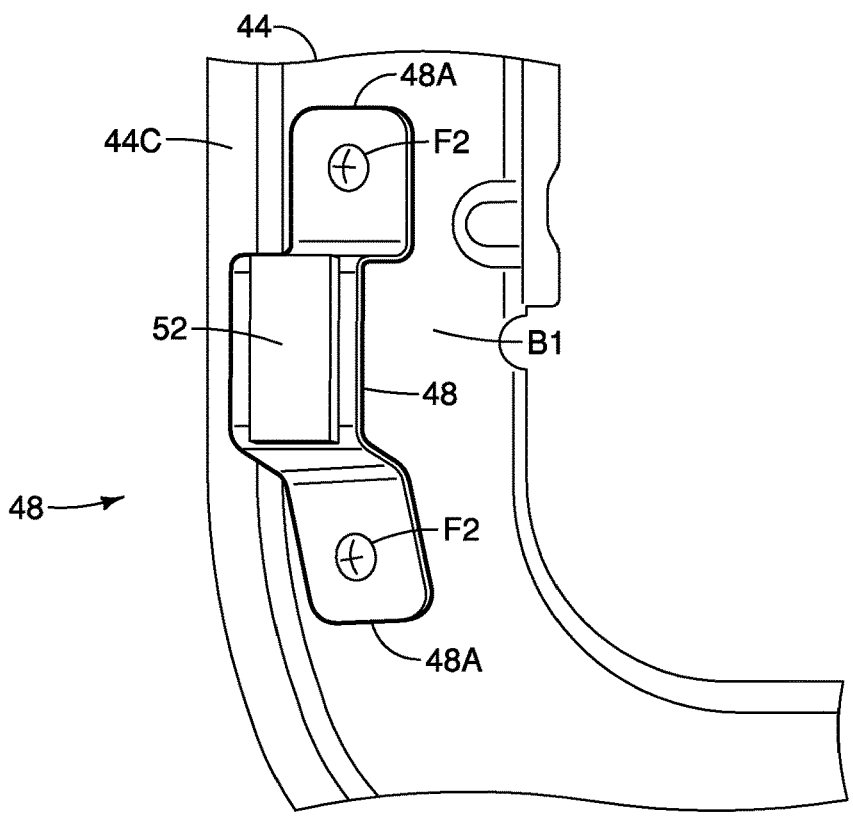
FIG. 8 is another enlarged view of the bracket assembly of FIG. 6 to show another one of the brackets of the bracket assembly.

Referring to FIGS. 4, 5, 9 and 10, the second and third brackets 46 and 48 are positioned between the attachment bracket 44 and the vehicle strut structure 22. In particular, the second and third brackets 46 and 48 are positioned between the attachment bracket 44 and the rearward facing surface S2 of the vehicle strut structure 22 to help maintain a desired distance between the vehicle strut structure 22 and the outer panel 16. Therefore, the second and third brackets 46 and 48 are positioned between the attachment bracket 44 and the inner assembly 38. As seen in FIGS. 9 and 10, the second bracket 46 extends from the attachment bracket 44 to abut the vehicle strut structure 22. As best seen in FIG. 4, the second bracket 46 protrudes in an inboard facing direction towards the vehicle strut structure 22. Therefore, the second bracket 46 protrudes away from the first bracket 44 in the inboard facing direction towards the vehicle strut structure 22. As best seen in FIG. 8, the second bracket 46 is fixed to the attachment bracket 44 at the inboard facing side B1 of the attachment bracket 44.

Figure 7:
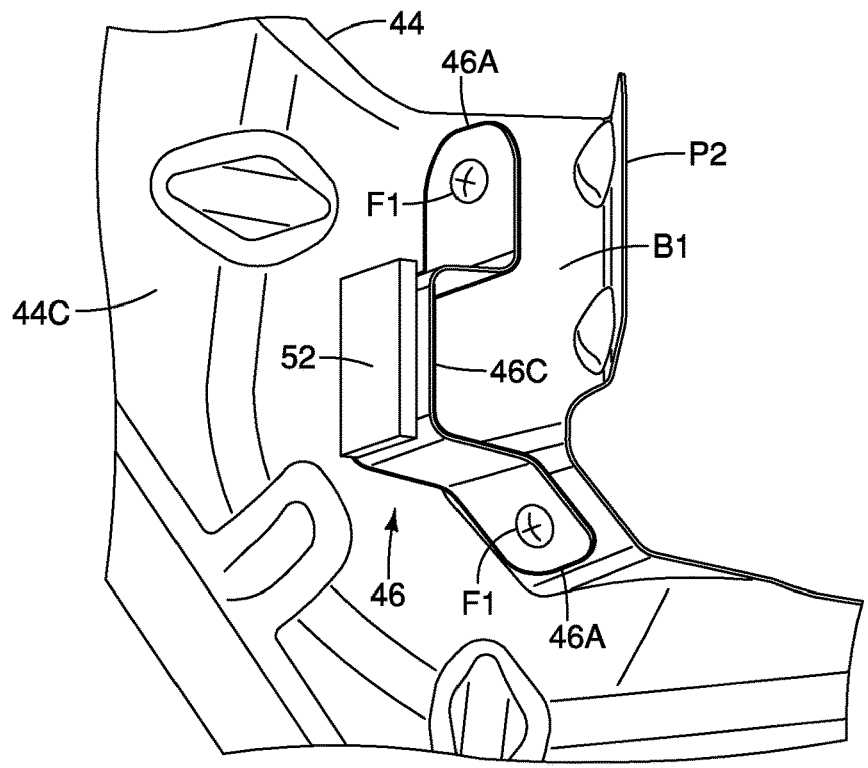
FIG. 7 is an enlarged view of the bracket assembly of FIG. 6 to show one of the brackets of the bracket assembly.

As best seen in FIGS. 6 and 7, the second bracket 46 is a mounting bracket having a channel U-shaped fitting. The second bracket 46 includes a pair of flanges 46A that are fixedly attached to the attachment bracket 44. Each of the flanges 46A has an opening 46B for receiving a fastener F1 (e.g., a screw or a bolt) for fastening the second bracket 46 to the attachment bracket 44. Thus, the attachment bracket 44 has at least a pair of corresponding openings that are to be aligned with the openings 46B of the second bracket 46 to receive the fasteners F1 therethrough. The second bracket 46 is attached to the main body 44C of the attachment bracket 44. In particular, the second bracket 46 is attached to the main body 44C at a location that is near the first projection P1. In this way, the second bracket 46 is preferably attached to the main body 44C at a location that is near where the attachment bracket 44 is attached to the lamp housing 30.

The second bracket 46 includes a U-shaped mount 46C that connects the pair of flanges 46A and is cantilevered with respect to the flanges 46A. The vehicle taillight assembly 12 preferably includes adhesive 52, such as an adhesive strip 52, that is disposed on the U-shaped mount of the second bracket 46, as seen in FIGS. 6 to 10. Therefore, the vehicle taillight assembly 12 further comprises a first adhesive 52 that is disposed on the second bracket 46. The first adhesive 52 is disposed between the vehicle strut structure 22 and the second bracket 46. In particular, the U-shaped mount 46C contacts and abuts the inner assembly 38 when the bracket assembly 50 is installed to the vehicle body structure 21. Preferably, the U-shaped mount 46C contacts the inner assembly 38 via the first adhesive 52 in order to secure the attachment of the second bracket 46 to the inner assembly 38.

As seen in FIGS. 9 to 11, the third bracket 48 extends from the attachment bracket 44 to abut the vehicle strut structure 22. The third bracket 48 protrudes in the inboard facing direction towards the vehicle strut structure 22. Therefore, the third bracket 48 also protrudes away from the attachment bracket 44 in the inboard facing direction towards the vehicle strut structure 22. As best seen in FIG. 8, the third bracket 48 is fixed to the attachment bracket 44 at the inboard facing side B1 of the attachment bracket 44.

The second and third brackets 46 and 48 are offset of each other. In particular, the second and third brackets 46 and 48 are attached to the main body 44C of the first bracket 44. Preferably, the second bracket 46 is attached to the main body 44C within the vicinity of the first protrusion P1 where the attachment bracket 44 is attached to the lamp housing 30. The third bracket 48 is attached to the main body 44C within the vicinity of the second protrusion P2 where the attachment bracket 44 is attached to the lamp housing 30. Thus, the second and third brackets 46 and 48 are preferably attached to the main body 44C at a location that is in the vicinity of where the attachment bracket 44 is attached to the lamp housing 30.

The third bracket 48 is also a mounting bracket having a channel U-shaped fitting. The third bracket 48 includes a pair of flanges 48A that are fixedly attached to the attachment bracket 44. Each of the flanges 48A has an opening 48B for receiving a fastener F2 (e.g., a screw or a bolt) for fastening the third bracket 48 to the attachment bracket 44. Thus, the attachment bracket 44 has at least another pair of corresponding openings that are to be aligned with the openings 48B of the third bracket 48 to receive the fasteners F2 therethrough. The third bracket 48 is attached to the main body 44C of the attachment bracket 44 at the inboard facing side B1 of the attachment bracket 44.

The third bracket 48 similarly includes a U-shaped mount 50C that connects the flanges 48A and is cantilevered with respect to the flanges 48A. The vehicle taillight assembly 12 preferably includes another adhesive 54, such as an adhesive strip 54, that is disposed on the U-shaped mount of the third bracket 48. Therefore, the vehicle taillight assembly 12 further comprises a second adhesive 54 disposed on the third bracket 48. The second adhesive 54 is disposed between the vehicle strut structure 22 and the third bracket 48. In this way, the third bracket 48 is positioned between the attachment bracket 44 and the vehicle strut structure 22. In particular, the U-shaped mount 48C contacts and abuts the inner assembly 38 when the bracket assembly 50 is installed. Preferably, the U-shaped mount 48C of the third bracket 48 contacts the inner assembly 38 via the second adhesive strip 54 in order to secure the attachment of the third bracket 48 to the inner assembly 38.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle taillight assembly. Accordingly, these terms, as utilized to describe the present invention should be interpreted relative to a vehicle equipped with the vehicle taillight assembly.

The term "configured" as used herein to describe a component, section or part of an apparatus that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle taillight assembly comprising:
   a first bracket including a pair of attachment arms that are configured to be supported to a vehicle strut structure;
   a second bracket fixed to the first bracket at an inboard facing side of the first bracket and protruding in an inboard facing direction towards the vehicle strut structure; and
   a third bracket fixed to the first bracket at the inboard facing side of the first bracket and protruding in the inboard facing direction, the second and third brackets being offset of each other, the second and third brackets being positioned between the first bracket and a rearward facing surface of the vehicle strut structure.

2. The vehicle taillight assembly according to claim 1, wherein
   the second bracket abuts the vehicle strut structure.

3. The vehicle taillight assembly according to claim 1, wherein
   the third bracket abuts the vehicle strut structure.

4. The vehicle taillight assembly according to claim 2, further comprising
   a first adhesive disposed on the second bracket, the first adhesive being disposed between the vehicle strut structure and the second bracket.

5. The vehicle taillight assembly according to claim 1, wherein the first bracket includes a main body extending between the pair of attachment arms.

6. The vehicle taillight assembly according to claim 1, wherein
   the second bracket is attached to the main body of the first bracket.

7. The vehicle taillight assembly according to claim 6, further comprising
   a third bracket that is attached to the main body of the first bracket.

8. A vehicle taillight assembly comprising:
   a vehicle body structure having a cavity defined by a vehicle strut structure;
   a first bracket supported to the vehicle strut structure, the first bracket includes a pair of attachment arms that are supported to the vehicle strut structure, the first bracket further having a main body that is cantilevered with respect to the pair of attachment arms;
   a lamp housing supported to the first bracket so to be disposed in the cavity; and
   a second bracket positioned between the first bracket and the vehicle strut structure.

9. The vehicle taillight assembly according to claim 8, wherein
   the second bracket protrudes away from the first bracket in an inboard facing direction towards the vehicle strut structure.

10. The vehicle taillight assembly according to claim 9, further comprising
    a third bracket positioned between the first bracket and the vehicle strut structure.

11. The vehicle taillight assembly according to claim 10, wherein
    the third bracket protrudes away from the first bracket in the inboard facing direction.

12. The vehicle taillight assembly according to claim 8, wherein
    the lamp housing is attached to the main body of the first bracket.

13. The vehicle taillight assembly according to claim 12, wherein
    the second bracket is attached to the main body of the first bracket.

14. The vehicle taillight assembly according to claim 13, wherein
    the third bracket is attached to the main body of the first bracket.

15. The vehicle taillight assembly according to claim 3, further comprising
    a second adhesive disposed on the third bracket, the second adhesive being disposed between the vehicle strut structure and the third bracket.

* * * * *